Nov. 24, 1925.
J. B. VAN DEREN
1,562,667
AUTOMATIC GRAIN WEIGHER
Original Filed Aug. 5, 1920   4 Sheets-Sheet 1
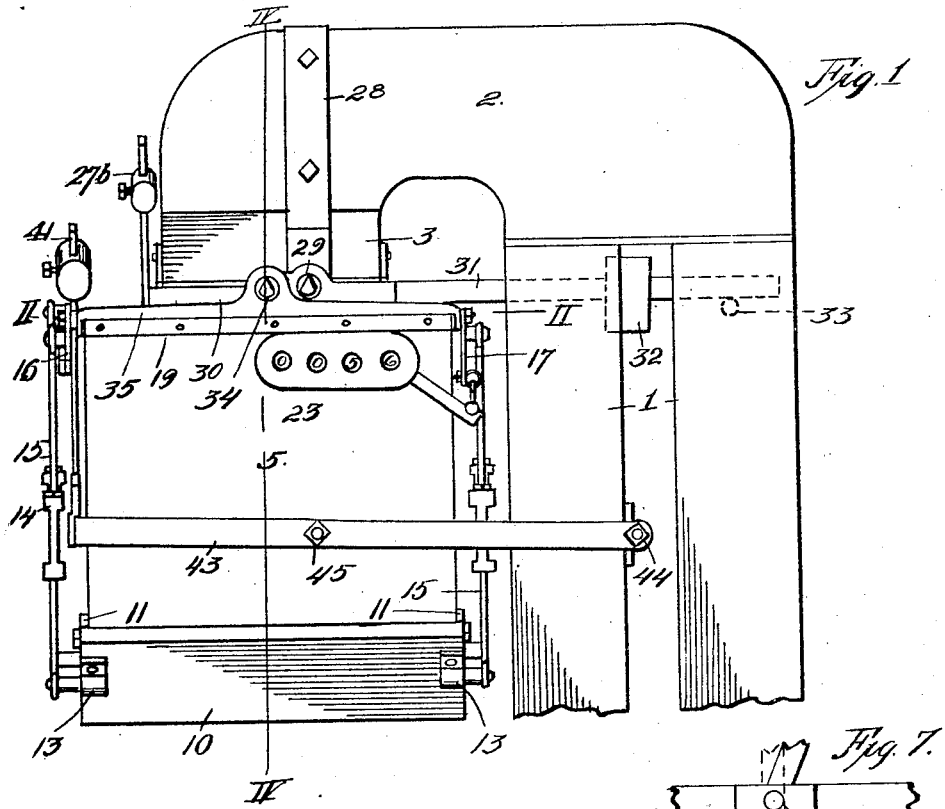
Fig. 1
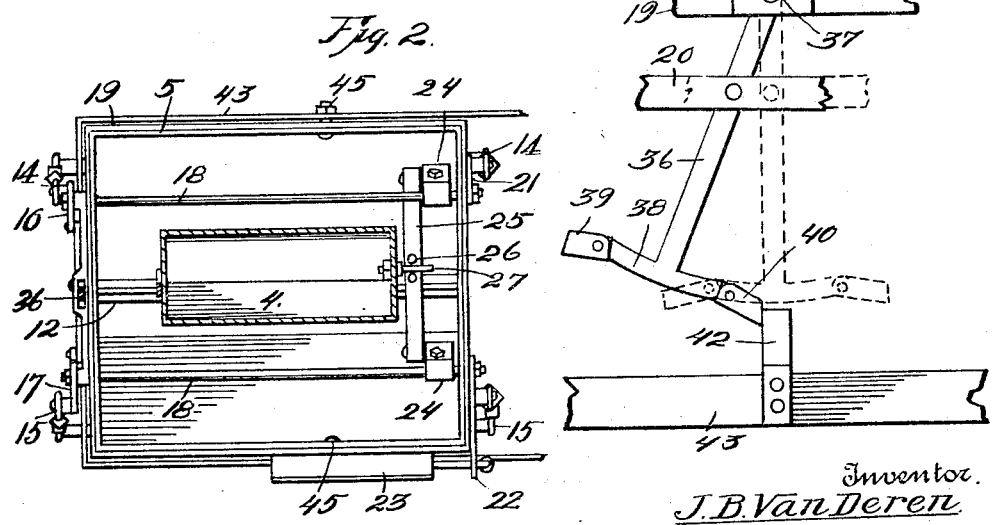
Fig. 2
Fig. 7
Witness:
R. E. Hamilton
Inventor.
J. B. Van Deren
By Thorpe & Girard
Attorneys

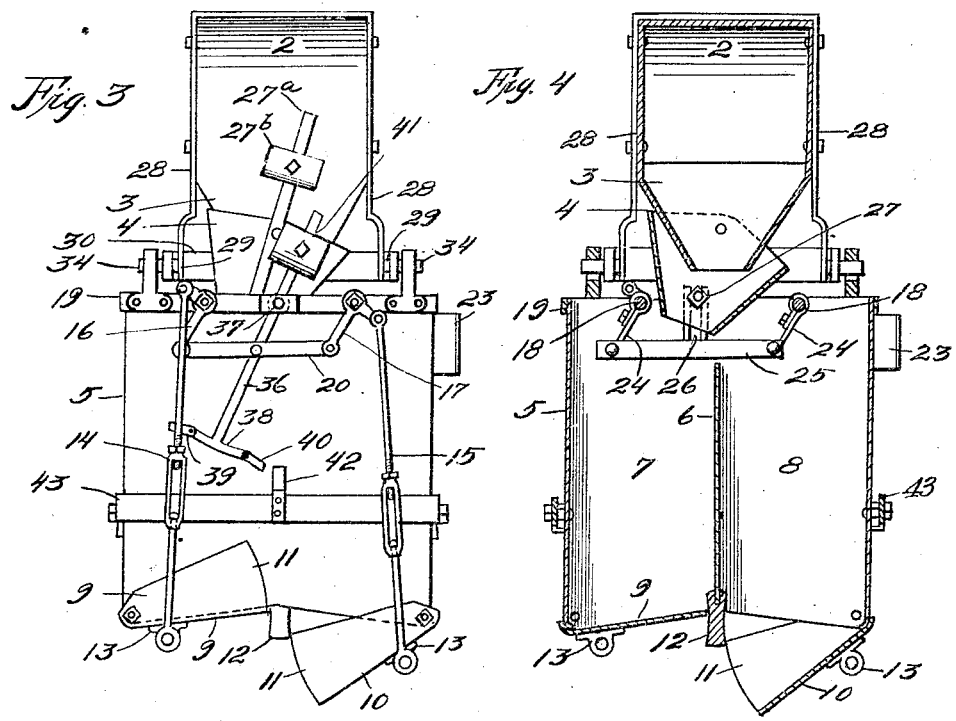
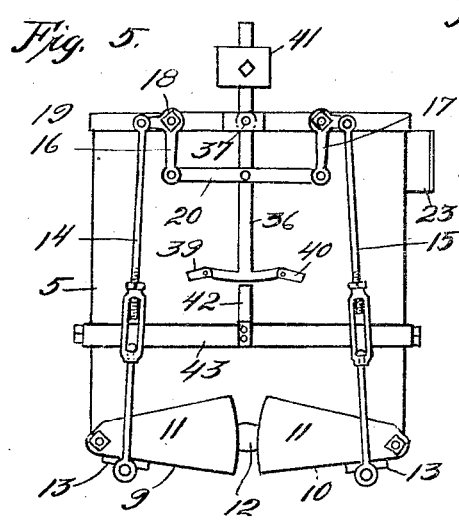
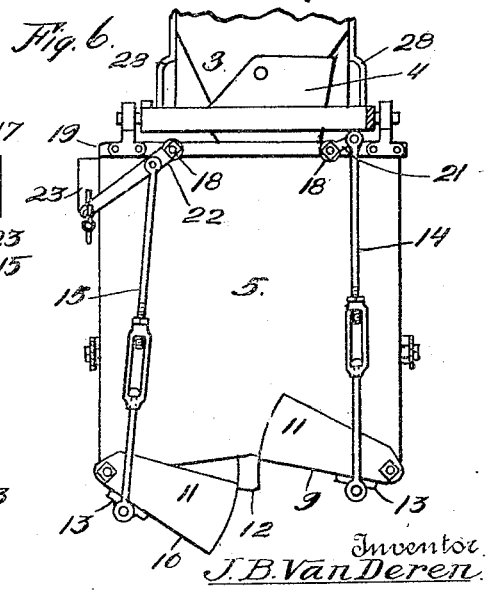

Nov. 24 1925.
J. B. VAN DEREN
AUTOMATIC GRAIN WEIGHER
Original Filed Aug. 5, 1920    4 Sheets-Sheet 3
1,562,667
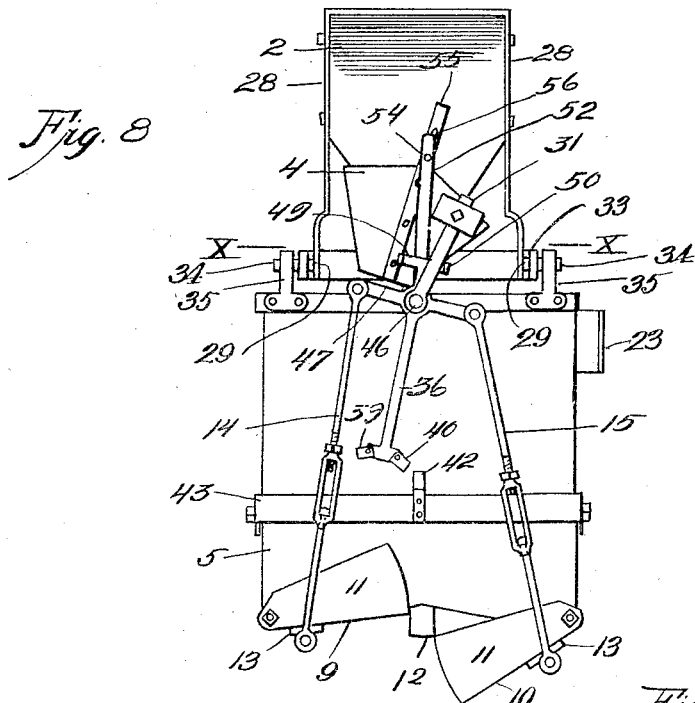
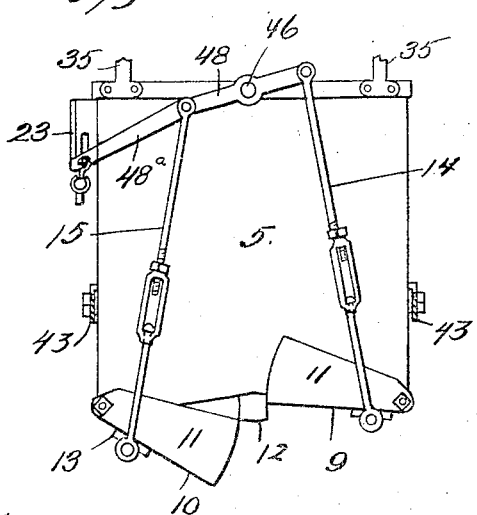
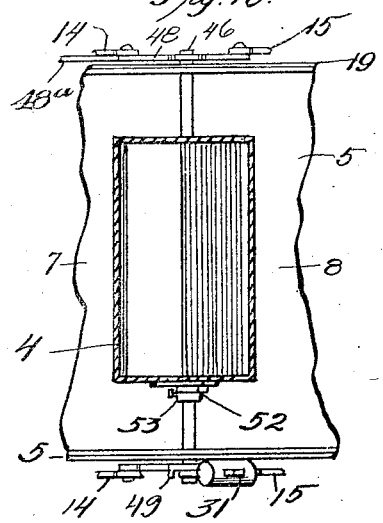

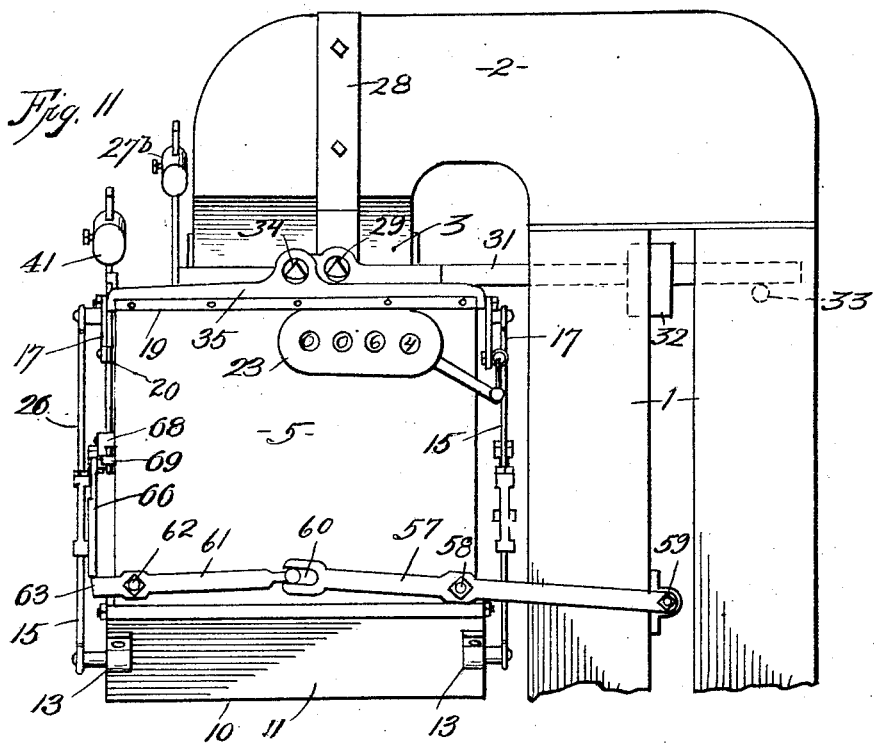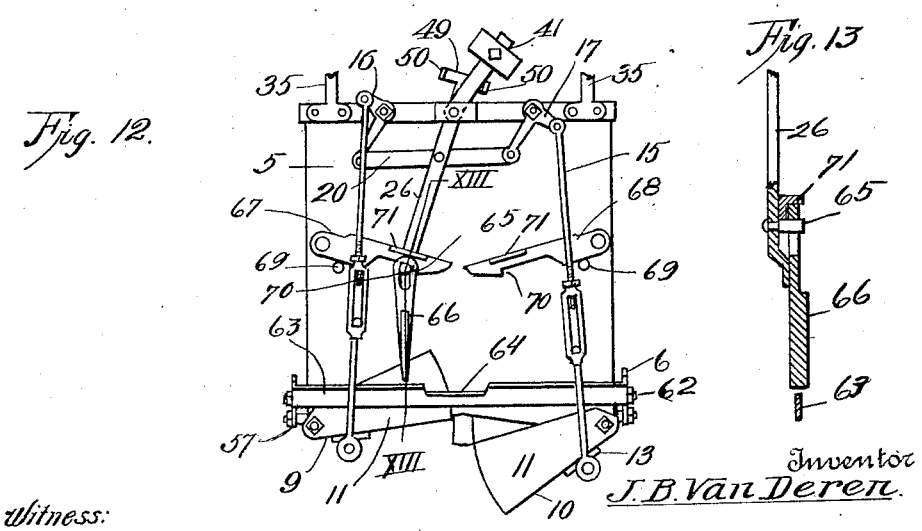

Patented Nov. 24, 1925.

1,562,667

UNITED STATES PATENT OFFICE.

JAMES B. VAN DEREN, OF HENNESSEY, OKLAHOMA.

AUTOMATIC GRAIN WEIGHER.

Application filed August 5, 1920, Serial No. 401,373. Renewed September 9, 1922. Serial No. 587,232.

*To all whom it may concern:*

Be it known that I, JAMES B. VAN DEREN, citizen of the United States, and resident of Hennessey, Kingfisher County, State of Oklahoma, have invented a certain new and useful Improvement in Automatic Grain Weighers, of which the following is a complete specification.

This invention relates to automatic grain weighers, and more especially to that class for weighing grain flowing in a continuous or intermittent stream from a bin or supplied by an elevator or the like, and my object is to produce a weigher which is accurate and reliable in operation, and of simple, strong, durable and comparatively inexpensive construction.

With this object in view, the invention consists in certain novel and useful features of construction and combination of parts as hereinafter described and claimed; and in order that it may be fully understood, reference is to be had to the accompanying drawing, in which:—

Figure 1 is a side elevation of a grain weighing machine embodying the invention and applied operatively to the head or discharge end of a grain elevator.

Figure 2 is a horizontal section on the line II—II, of Figure 1.

Figure 3 is a front view of the same.

Figure 4 is a vertical section taken on the line IV—IV of Figure 1.

Figure 5 is a front view of the weigher detached from the elevator and with the controlling gate or doors in a different position from that shown by that in Figure 3.

Figure 6 is a rear view of the construction disclosed by Figure 3.

Figure 7 is an enlarged fragmentary view showing certain features appearing in the front view, on an enlarged scale.

Figure 8 is a front view analogous to Figure 3 but illustrating a modified construction.

Figure 9 is a rear view of the construction disclosed by Figure 8, but omitting the elevator.

Figure 10 is a horizontal fragmentary section taken on the line X—X of Figure 8.

Figure 11 is a side elevation corresponding to Figure 1, but showing another modification.

Figure 12 is a front view of the construction disclosed by Figure 11.

Figure 13 is a section on the line XIII—XIII of Figure 12.

In the said drawings, 1 indicates the legs of an elevator of any suitable type, and 2 is the head thereof into which the grain is discharged, the head terminating in a tapered nozzle 3 for discharge into an oscillatory spout 4 depending into a weigher hopper 5. The hopper is divided by a central partition 6 underlying the pivotal point of the spout, into similar compartments 7 and 8, closed respectively at their bottoms by doors 9 and 10. The doors are provided with upwardly projecting side flanges 11 to convert them into chutes and are hinged near the outer side walls of the respective compartments, the hinge pivots being above the plane of the door surface and pivoted to the container above the bottom of the plane of the respective compartments, which give the doors a very free and complete opening hinge movement, and a more pronounced outward movement, causing a freeing movement in relation to the division bar 12. This division bar extends downward from the container a short distance between the free edges of the doors, and prevents material discharge of grain from the closed door when in relaxed position and permits placing the free edges of the doors near each other without the opening door discharging onto the closing door.

Each door is provided with a bracket 13 and pivoted thereto respectively at their lower ends are rods 14 and 15. It will be noted that the pivotal connection of these rods to the doors is below the plane of the pivot point of the hinges of the doors, which causes a more pronounced movement of the pivots of the rods towards the vertical plane of the hinge pivots of the doors as the doors open, and that the pivots are placed laterally with reference to the hinge points, and the grain supporting surface of the doors, to give the doors a leverage on said rods, and it is important that these connections be positioned so that the rods carry a much greater portion of the weight of the doors, and the load imposed upon them than that borne by the hinges of the doors. The increased movement of the pivot points of the rods toward the vertical plane of the hinge pivot of the doors tends to increase the power of the opening doors and decrease the resistance of the closing doors and increases the holding power of the open door, and these functions are enhanced by reason of the lateral position of the rod pivots, as above described.

The upper ends of the rods 14 and 15 at the front side of the hopper are pivoted to the short arms of a pair of reversed bell-crank levers 16 and 17 secured on the end of a pair of parallel shafts 18 respectively bridging the compartments 7 and 8 and journaled in a reinforcing band 19 secured to the upper end of the hopper, the long arm of the bell-crank levers being pivotally connected by a link 20. Secured on the opposite ends of said shafts 18 are a pair of crank arms 21 and 22, the former being pivotally attached to the upper end of the other rod 14, and the crank arm 22 to the upper end of the other rod 15, and said crank arm 22 is extended or increased in length and connected to operate a register 23, secured to one side of the hopper. The specific construction of the register forms no part of this invention, and is merely adapted to record the amount of grain which is weighed and passed through the hopper. Within the hopper and near its rear wall by preference, shafts 18 are provided with a pair of depending crank arms 24, pivotally connected by a link 25, provided with a pair of upwardly projecting pins 26 receiving between them a pin 27 projecting from the oscillatory spout 4.

A pair of hangers 28 secured to the discharge end of the head 2 are provided with bearing points 29 upon which is fulcrumed the rectangular frame 30, provided with a scale beam 31 equipped with an adjustable poise 32, a pin 33 projecting from a fixed point of the structure, such as a leg of the elevator, limiting downward movements of the weighted end of the scale beam.

The hopper 5 is suspended from the scale beam at the opposite side of its pivotal point from the weight 32 upon a pair of knife edge points 34 projecting from the said scale beam, the hopper is provided with a pair of parallel bars 35 having openings receiving said points 34. It will thus be seen that as the hopper is pivotally suspended from the scale beam, which in turn is fulcrumed in fixed position with respect to the head 2, that weight imposed upon or within the hopper will result in downward movement of the same and upward movement of the weighted end of the scale beam, and that the adjustments of the poise on said beam will determine the weight which is necessary to effect downward movement of the hopper sufficient to accomplish the desired purpose, as hereinafter more particularly described.

As hereinbefore stated, the doors 9 and 10 are capable of a limited movement before opening to permit grain to discharge from the compartments of the hopper, this lost motion being provided to insure ample operation of a locking mechanism employed to prevent premature opening of the doors to discharge the grain from the hopper, which locking mechanism is constructed as follows: 36 is a lever pivoted at 37 to the band 19 of the hopper and pivotally connected at a lower point to the link 20, the lever terminating at its lower end in oppositely projecting arms 38 extending concentrically of pivotal point 37. At one end, the lever is provided with a pivoted extension 39 of one of its arms 38, and at the other with a similar extension 40, the pivoted extensions being so arranged that they are free to move upward but are limited as to downward movement. This locking lever obviously is operated through the opening and closing of the doors, but to aid in this movement and make it more positive and reliable, the lever is extended upward beyond its pivotal point and equipped with an adjustable weight 41. The pivoted locking dogs 39 and 40 as the said extensions are hereinafter termed, are adapted for alternate engagement with an upwardly projecting arm 42 on a lever 43 fulcrumed at a fixed point with respect to the elevator, as at 44 on one of the legs thereof, and said lever, which embraces both sides and the front of the hopper, is pivoted at 45 to the hopper so as to be moved downward and upward therewith, and thus withdraw the stop arm 42 from the path of dog 39 or 40 with which it is engaged at the time.

Assuming that the parts are in the position shown by Figures 1, 3 and 4, it will be apparent that grain discharged from the elevator through the spout will enter compartment 7 and accumulate upon the closed door 9, and that such door cannot open under the impact or weight of the grain upon it, sufficiently to discharge any of the grain, as under the initial opening movement, the dog 40 will strike and be arrested by the stop arm 42, though this action will not take place until the gravitative force of weight 41 is overcome. With the locking mechanism thus holding the parts as explained, the grain continues to flow into compartment 7 until the latter contains a sufficient volume of grain to overcome the resistance of the poise 32. When this occurs, the lever beam 31 operates and the hopper moves downward until arm 42 is withdrawn from the path of the dog 40. As this occurs, the weight of the grain continues and completes the opening of the door 9 and through the connecting link 20 closes the door 10. At the same time through the connecting link 25, and the pin 26, the oscillatory spout 4 is swung from the position shown in Figure 4 to its reverse position where it delivers into the compartment 8. In the movement of link 20 above mentioned, the locking lever 36 is of course, swung to the right and in the adjustment of spout 4, and weight 27ᵇ is swung to the left, said weight being employed in order to make the action of the spout more reliable, as it resists accidental rocking movements and then insures the completion of such movements. In the event that the positive action applied to the lever 36 through the link 20 should be insufficient through wear or any other cause, to throw said lever its full distance, the weight 41 is intended to perform such function and thus give the said lever a range of movements which will insure that the dogs 39 and 40 shall pass the stop-arm 42 sufficiently to drop and be ready to engage said arm on the initial movements of the respective doors as grain begins to enter the respective compartments. If straw or the like prevents full closing of a door, the locking mechanism might fail to swing its full distance, and in this event, the weight, 47, as above explained, will complete or impart sufficient movement to the locking lever, to place the same in operative condition. In the event both doors are partially clogged, each will discharge grain at less than the predetermined weight or volume, and with discharges the obstruction will be dislodged and the locking mechanism will again function properly.

It will be noticed that the opening door has an increased leverage over the closing door, by reason of the pivotal connection with the doors of the rods 14 and 15, and this tends to insure a more efficient and reliable operation, in fact, tends to close the open door even if the weight 41 is dispensed with, although, this weight reduces friction of the locking dogs on the trip-arm and permits of freer action of the scale beam and consequently more accurate weighing and also assists in holding the doors in their extreme positions. The oscillatory spout or valve has play connection with the door to permit it to be moved its full distance even though the door may not be fully closed because of clogging by straw or otherwise, as above referred to.

In Figures 8 to 10 inclusive, a modified instruction is shown as follows: The shaft 18 and bell-crank levers 16 and 17 and cranks 21 and 22 are dispensed with, and in lieu thereof, a single shaft 46 is provided, the spout 4 being disposed in a higher plane in this construction in order to avoid conflict with shaft 46, upon the opposite ends of which are mounted rock-levers 47 and 48, to which are pivotally connected the rods 14 and 15. One of the rock-levers is provided with a depending arm or lever 36, and the same is equipped at its lower end with the dogs 39 and 40 adapted for alternate engagement with the stop-arm 42 of the lever 43. The rock-lever 48 is provided with extension arm 48ᵃ pivotally connected to operate the recording device 23, and the rock-lever 47 is provided with an upwardly projecting T-shaped extension 49 terminating in outwardly projecting lugs 50 between which is adapted to swing or play weighted lever 51 pivoted on shaft 46. This weighted lever is adapted to perform for the construction shown by Figures 8 to 10 inclusive, the same service as weighted lever 41 provides in the preceding figures, as when the doors are opened and closed, the said weighted lever is pushed by one of the lugs 50 until it passes beyond the center of gravity, and then it falls to the opposite side and strikes against the other lug 50, the impetus or momentum thus gained, insuring the full and complete movements of the lever 36 with respect to the arm 42.

A rock arm 52 is secured rigidly by a set screw 53 (see Figure 10) upon shaft 46, and is pivoted at 54 to an arm 55 projecting upward from the adjacent end of the spout 4, the arm 55 having a slot 56 to accommodate the necessary play of the pin 54 due to the fact that the arm 52 and the arm 55 swing from different centers, the axis of movement of the latter being coincidental with the pivotal point of the spout 4 on the lower end of the head 2. Except for the differences above described, the construction and operation of the construction of the mechanism shown by Figures 8 to 10 inclusive, is identical with that of the preceding figures, and a detailed description of the operation is therefore unnecessary.

In Figures 11 to 13 inclusive, the novelty of construction over the two types of construction already described resides wholly in the locking mechanism. In the last named figures it will be noted that there is a lever 57 pivoted at 58 to the hopper and fulcrumed at 59 to the leg of the elevator, and that the free end of said lever is forked at 60 to receive the reduced end of a rock arm 61 pivoted at 62 to the hopper and extending across the front side of the same. It will thus be seen that downward movement of the hopper results in upward swinging movement of the portion 63 of said rock-arm 61, and by reference to Figure 12, it will be seen that said portion 63 is provided with a recess 64 about mid-way its length. In this construction, the lever 26 is provided at its lower end with forwardly projecting pin 65. 66 is a dog pivotally suspended from pin 65 and having a slotted engagement with the latter for a purpose which hereinafter appears, said dog being adapted to occupy a position vertically above lever extension 63 at one side or the other of the recess 64 of said extension. 67 and 68 are similar latches pivoted to the hopper and limited in their downward movement by underlying pins or studs 69, each of the latches being formed with a shoulder 70 at its under edge and tapered upwardly from said shoulder to its free end, and each latch is also provided with a forwardly projecting lug 71 for alternate engagement with the upper end of the dog 66 for the purpose of preventing upward movement of the same and hence of the extension 63 of lever 61. With the parts positioned as shown in Figure 12, a slight descent of the hopper due to the initial charging of one of the compartments thereof results in causing the extension 63 to press the dog 66 upward against the overlying lug 71 of one of the latches, but said latch is not disturbed until the predetermined weight is upon the closed door of the hopper. When this condition exists, the extension 63 forces the dog 66 to raise the latch 67 and trip the shoulder 70 thereof from engagement with the pin 65 of lever 36. This permits the door to swing open and the other door to be closed in the manner already explained, and incidental to this movement, the lever 36 swings across the face of the hopper and its pin 63 engages the beveled end of the right hand latch and raises the same, the latch immediately dropping back and causing its shoulder 70 to engage said pin 65 and thus lock the dog 66 in operative position at the opposite side of the recess 64, which recess is provided so that the dog may swing freely with the lever 36 without interference on the part of the extension 63. As the operation of the entire weigher has been set forth, it is not believed that any recapitulation thereof is essential, but it is to be understood that all modifications falling properly within the spirit and scope of the invention and the appended claims may be resorted to without departure from the scope of the latter.

From the above description, it will be apparent that I have produced an automatic weigher which will operate efficiently, reliably and which embodies the desirable features of simplicity, strength, durability and comparative inexpensiveness of construction.

I claim:

1. An automatic grain weigher, comprising a scale beam a hopper pivotally suspended therefrom, having two compartments, a door for each compartment simultaneously operable in reversed directions, a movable device actuated by up and down movements of the hopper, a lever on the hopper, prevented from movement by said device when the hopper is elevated, an oscillatory spout for directing grain into the compartment having its door closed, means actuated by a sufficient weight of grain in such compartment to lower the hopper, to unlock the door, bell-cranks pivoted on the hopper and linked together and to said lever; links pivotally connecting the opposite ends of the respective bell-cranks to the doors below the hinges thereof to give the opening door added leverage in closing the other door, and means actuated by the movement of the doors to reverse the position of the spout and change the flow of grain into the other compartment.

2. An automatic grain weigher comprising a scale beam, a yieldingly-elevated hopper pivotally suspended from said scale beam and having two compartments and a pivoted door controlling each compartment, a lever pivoted to the hopper and movable by up and down movement thereof, and provided with an arm, a lever pivoted to the hopper and provided with a pair of dogs for alternately engaging said arm to hold one door closed and the other open, and means operable by the doors in the initial part of the opening movement of the closed one, caused by a sufficient weight in the hopper to lower the same and thereby withdraw said arm from the path of the engaging dog, to swing the lever and dispose its other dog in position to be locked against reverse movement of the lever, as the hopper is reelevated and reverses the movement of said arm.

3. An automatic grain weigher comprising a scale beam, a yieldingly-elevated hopper pivotally suspended from said scale beam and having two compartments and a pivoted door controlling each compartment, a lever pivoted to the hopper and movable by up and down movement thereof, and provided with an arm, a lever pivoted to the hopper and provided with a pair of dogs for alternately engaging said arm to hold one door closed and the other open, means operable by the doors in the initial part of the opening movement of the closed one, caused by a sufficient weight in the hopper to lower the same and thereby withdraw said arm from the path of the engaging dog, to swing the lever and dispose its other dog in position to be locked against reverse movement of the lever, as the hopper is reelevated and reverses the movement of said arm; and means cooperating with the door in shifting the position of the dog-carrying lever.

4. An automatic grain weigher, comprising a scale beam, a hopper pivotally suspended therefrom and having two compartments, a door for each compartment simultaneously operable in reverse direction, a movable device actuated by up and down movements of the hopper, a lever on the hopper, prevented from movement by said device when the hopper is elevated, an oscillatory spout for directing grain into the compartment having its door closed, means actuated by a sufficient weight of grain in such compartment, to lower the hopper, to unlock the doors, to permit the closed and opened doors to open and close respectively, a link operatively connected to the spout, and means actuated by the door-movement, for causing the link to reverse the position of the spout.

5. In an automatic grain weigher comprising a scale beam, a yieldingly-elevated hopper pivotally suspended from said scale beam and having two compartments, a pair of pivoted doors at the discharge ends of the compartments, a division bar between the free ends of the doors, an oscillatory spout to discharge alternately into said compartments as the doors thereof are closed, a lever having a locking arm, and movable by up and down movement of the hopper, a swinging lever on the hopper, provided with dogs for alternate locking engagement with said arm when the hopper is elevated and adapted to swing clear thereof when the hopper is depressed by a charge of grain therein, and means for transmitting power from either door as it is opened by the grain, after being unlocked by depression of the hopper beyond the division bar, to swing the said dog-carrying lever, close the other door and change the position of the spout to discharge into the other compartment.

6. In an automatic grain weigher comprising a scale beam, a yieldingly-elevated hopper pivotally suspended from said scale beam and having two compartments, a pair of pivoted doors at the discharge ends of the compartments, a division bar between the free ends of the doors, an oscillatory spout to discharge alternately into said compartments as the doors thereof are closed, a lever having a locking arm, and movable by up and down movement of the hopper, a swinging lever on the hopper, provided with dogs for alternate locking engagement with said arm when the hopper is elevated and adapted to swing clear thereof when the hopper is depressed by a charge of grain therein, a recording device, and means actuated by the opening movement of either door, for operating the recording device.

7. In an automatic grain weigher, a yielding-elevated hopper having two compartments open at the bottom, doors controlling said compartments and pivoted to opposite sides of the hopper at the lower end thereof, a partition across the hopper between the lower end thereof, a partition across the hopper between the free edges of the doors and provided with concave faces substantially concentric of the axis of said doors and depending to a plane below that of said axis, a movable device actuated by up and down movements of the hopper under the loading and unloading thereof, a latch mechanism cooperating with said movable device in locking either door closed and the other open, and link mechanism pivotally connecting the doors together and to said latch mechanism, said mechanism being connected to the doors at points below the plane of the axis thereof.

8. In an automatic grain weigher, a container, a vertical partition forming two compartments in said container, a division bar extending downward from the partition, and a pair of doors hinged near the outer side walls of said compartments respectively, for opening and closing alternately, the hinge pivots of said doors being placed above the plane of the grain supporting surface of said doors, said doors when closed having their respective free edges close to the respective sides of the division bar and above the plane of the lower edge thereof.

9. In an automatic grain weigher, a container, a vertical partition forming two compartments in said container, a division bar extending downward from the partition, and a pair of doors hinged near the outer side walls of said compartments and above the plane of the bottoms thereof respectively, for opening and closing alternately, said doors when closed having their respective free edges close to the respective sides of the division bar and above the plane of the lower edge thereof.

10. In an automatic grain weigher, a container having two compartments, a division bar extending downward below the bottoms of said compartments, winged doors hinged near the outer side walls of said compartments respectively, and means whereby opening movement of either door shall affect closing movement of the other door, said means being connected with said doors respectively below the plane of the hinges thereof, said doors when closed having their respective free edges close to the respective sides of the division bar and above the plane of the lower edge thereof.

11. In an automatic grain weighing device, a container having two compartments, hinged doors to open and close the bottoms of said compartments respectively through downward and upward movements, means connecting said doors whereby downward movement of either door shall affect upward movement of the other door, said means being connected with said doors respectively below the plane of the hinges thereof, and a division bar between the free edges of said doors preventing material discharge of grain from either compartment when the respective door stands with its free edge above the plane of the lower edge of the division bar and permitting close proximity of the doors to each other without the opening door discharging grain on the closing door.

12. In an automatic grain weigher, yieldingly elevated container having two compartments, hinged wing doors controlling the bottoms of said compartments respectively, by alternate opening and closing movements, the hinged points of said doors being above the plane of the grain supporting surface of the doors, means for connecting said doors whereby as either door is opened, the other door shall close, said means being connected with said doors respectively below the plane of the hinged points thereof and laterally to give said doors a leverage on said means, a division bar between the free edges of said doors, and an oscillating deflector for discharging grain into said compartments alternately as the doors are closed.

13. In an automatic grain weigher, yieldingly elevated container having two compartments, hinged wing doors controlling the bottoms of said compartments respectively, by alternate opening and closing movements, the hinged points of said doors being above the plane of the grain supporting surface of the doors, means for connecting said doors whereby as either door is opened, the other door shall close, said means being connected with said doors respectively below the plane of the hinged points thereof and laterally to give said doors a leverage on said means, a division bar between the free edges of said doors, and a trip lever pivoted on the container, and to a relatively stationary object and operable by downward and upward movement of the container, and adapted for use in connection with any suitable latch mechanism in controlling the application of power to said doors.

14. In an automatic grain weigher, a container having two compartments, hinged wing doors for alternately opening and closing said compartments respectively, said doors being hinged above the plane of the surface thereof, a division bar between the free edges of the doors and means whereby as either door opens, the other shall close, said means being pivotally connected with said doors below the plane of the hinges thereof.

15. In an automatic grain weighing device, a container, a vertical partition dividing it into two compartments and a division bar extending downward from the partition, a pair of doors hinged to the lower end of the container for opening and closing alternately, the free edges of each door when in the horizontal plane of the division bar, being closed substantially to the escape therefrom of grain or of discharging grain falling upon the closing door, and means connecting said doors whereby downward movement of either door shall affect upward movement of the other door; said means being pivotally connected to said doors respectively, below the plane of the hinges thereof to increase the operative leverage of the opening door as it opens and decrease the resistance of the other door as it closes.

In witness whereof, I hereunto attach my signature.

JAMES B. VAN DEREN.